United States Patent

Lindblade et al.

[15] 3,638,177
[45] Jan. 25, 1972

[54] METHOD AND APPARATUS FOR SEISMIC SIGNAL VELOCITY DETERMINATION

[72] Inventors: Paul V. Lindblade, Ponca City, Okla.; Paul G. Mathieu, Pittsburgh, Pa.

[73] Assignee: Continental Oil Company, Ponca City, Okla.

[22] Filed: July 25, 1969

[21] Appl. No.: 844,898

[52] U.S. Cl.........340/15.5 GC, 340/15.5 MC, 340/15.5 TC, 340/15.5 CC
[51] Int. Cl. ..........................................................G01v 1/00
[58] Field of Search....................340/15.5; 181/0.5 R, 0.5 FS

[56] References Cited

UNITED STATES PATENTS

| | | | |
|---|---|---|---|
| 3,273,114 | 9/1966 | Stephenson et al.....................| 340/15.5 |
| 3,274,541 | 9/1966 | Embree ................................| 340/15.5 |

Primary Examiner—Rodney D. Bennett, Jr.
Assistant Examiner—S. C. Buczinski
Attorney—Joseph C. Kotarski, Henry H. Huth, Jerry B. Peterson, William J. Miller, David H. Hill and Craig, Antonelli, Stewart and Hill

[57] ABSTRACT

A method for determining actual velocities of seismic events occurring on plural seismic traces by deriving a trace coherence factor which varies directly with signal velocity. The method consists of processing move-out-corrected, plural seismic traces at a plurality of different time delay per trace relationships to establish a coherence factor at each time delay per trace. The coherence factor is arrived at for each probable velocity by summing all trace values and then finding a respective difference value as between each of the trace values and the sum value, which difference values are further processed by summation of their absolute values for derivation of a reciprocal trace value. The reciprocal trace value is then utilized as a gain control factor for controlling time variation of the amplitude of summed seismic traces, and the output trace value so controlled constitutes an accurate indicator of coherence of events occurring at the selected velocity.

7 Claims, 6 Drawing Figures

INVENTORS
PAUL V. LINDBLADE &
PAUL G. MATHIEU
BY William J. Miller
ATTORNEY

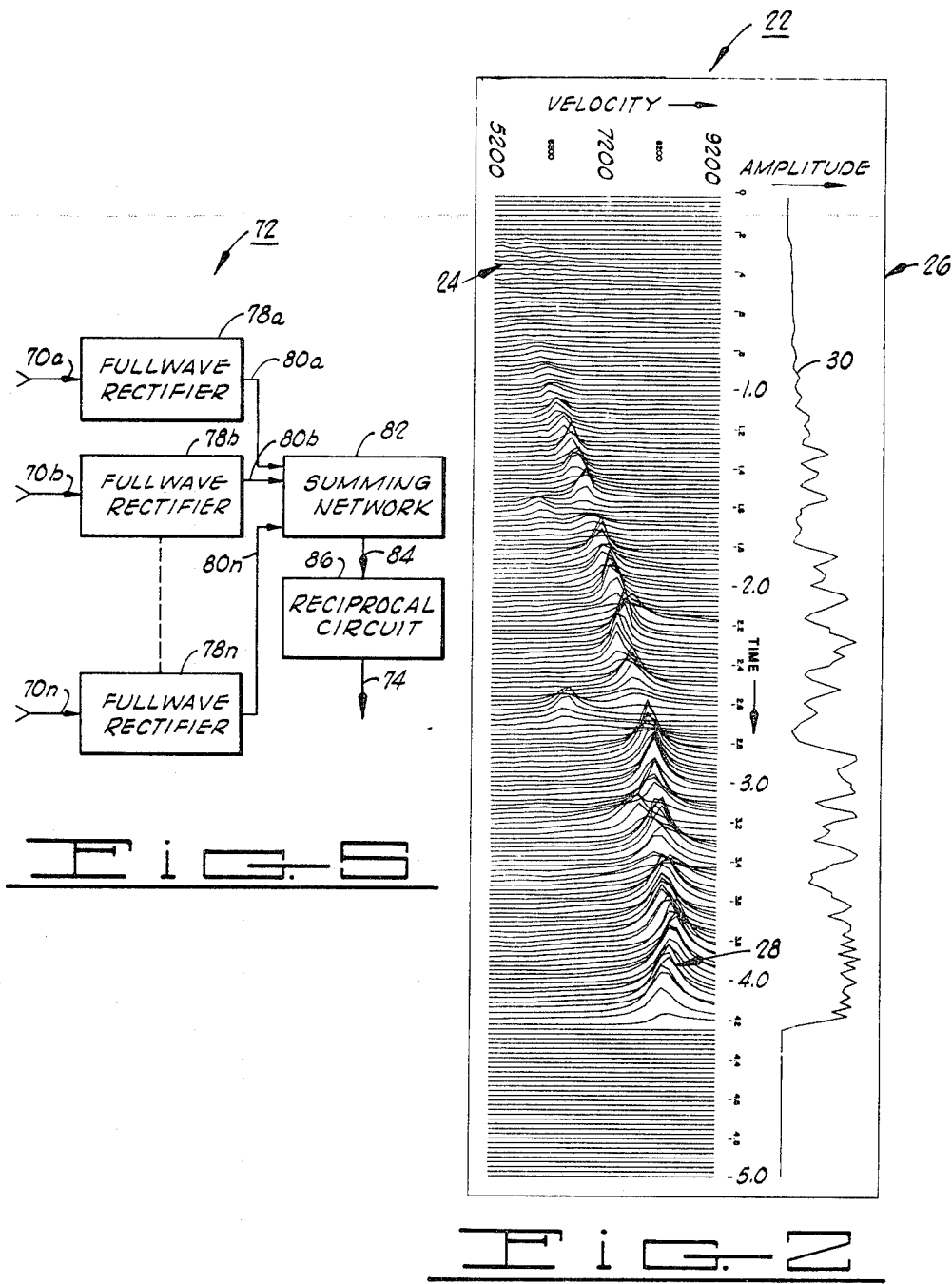

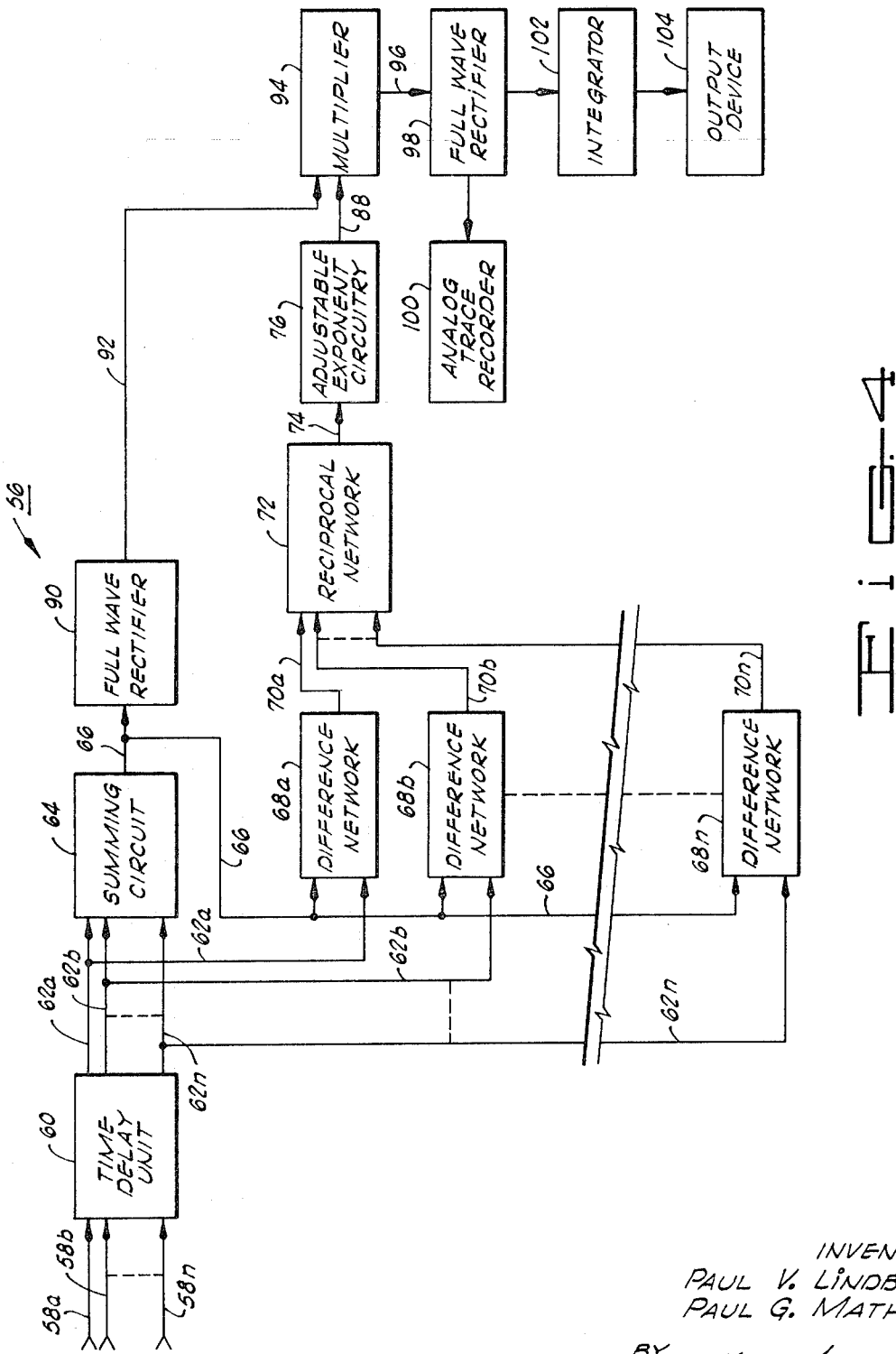

METHOD AND APPARATUS FOR SEISMIC SIGNAL VELOCITY DETERMINATION

BACKGROUND OF THE INVENTION

1. Field of the Invention

The invention relates generally to processing of multitrace seismic energy return and, more particularly, but not by way of limitation, it relates to an improved processing method capable of establishing a high degree of coherence in the velocity domain of seismic events on related seismic traces.

2. Description of the Prior Art

The prior art includes various types of seismic energy signal processing methods and apparatus, and these methods range from basic amplification selective systems through more advanced methods which attempts to emphasize specific seismic event information by emphasizing selected characteristics of velocity and space in addition to conventional time domain considerations. Most of the prior attempts at signal processing have in some way emphasized large amplitude data and deemphasized small amplitude data on the theory that large acoustical discontinuities would produce large amplitude events. Such processing approaches have been constantly made difficult by the necessity to encounter large amplitude noise and interference return as well as the more orderly multiple event returns. Still other approaches such as the employ of inverse filters perform well with respect to specific types of seismic return; however, here again, modes of further analysis and other signal-evaluating considerations are more or less limited to the time domain relationships.

SUMMARY OF THE INVENTION

The present invention contemplates a seismic energy processing method which is capable of determining correct velocities by obtaining a measure of the coherence of seismic event signals which are ordered in a specific velocity relationship between plural seismic signals. The method succeeds in establishing a coherence factor which is indicative of the degree of coherence between plural seismic traces for a specific velocity consideration; and the method may be carried out for a group of selected velocities to ascertain velocities of all events of interest which may be present on a group of related seismic signals.

The method of the invention may be carried out by various types of apparatus, either digital or analog, which is capable of performing the prescribed coherence evaluation. The plural input seismic traces are adjusted to a predetermined velocity or trace-to-trace time delay whereupon the aggregate output is summed to provide a means output trace signal. The time adjusted input trace signals are then processed to derive a plurality of difference signals, each of which is then made absolute for summation and derivation of the reciprocal trace value thereof. The reciprocal trace signal is then used to control the amplitude of the mean output trace signal through a multiplier, and a multiplied trace signal is rectified to produce an absolute value trace signal which may be summed over specific time intervals to provide a coherence factor indication. A distinct coherence factor indication may be derived for the plural input trace signals for each selected or time-adjusted velocity, there being any number of selected velocities in accordance with prior knowledge of the terrain, desire for specific information, etc.

Therefore, it is an object of the present invention to provide a seismic energy interpreting system which is capable of precisely determining actual velocities of seismic energy for specific events.

It is also an object of the present invention to provide a seismic energy signal processing system which is operable to derive a coherence factor indicative of the degree of time, polarity and amplitude simultaneity of returned seismic signals.

Finally, it is an object of the invention to provide a method and apparatus for determining the signal content of plural-trace seismic signals to obtain actual velocity information relative to selected significant seismic events.

Other objects and advantages of the invention will be evident from the following detailed description when read in conjunction with the accompanying drawings illustrating the invention.

BRIEF DESCRIPTION OF THE DRAWING

FIG. 2 is a representation of a velocity spectrum plot including a power trace for a time-velocity array;

FIG. 4 is a block diagram of apparatus which may be employed in carrying out the method of the invention;

FIG. 5 is a block diagram of a suitable form of reciprocal network which may be employed in the invention.

DETAILED DESCRIPTION OF THE INVENTION

The present invention consists of a method and apparatus for determining average value seismic energy velocities from raw seismic data. Such determinations may be valuable for many different signal-processing applications, as particularly for establishing the velocities necessary for effecting normal move-out correction of common basement point data and for use in interval velocity computations. The present method allows compilation of a velocity spectrum over an entire applicable velocity range, and this information, in turn, allows more rapid and more accurate setting up of the move-out correction and processing apparatus.

Figure 1:
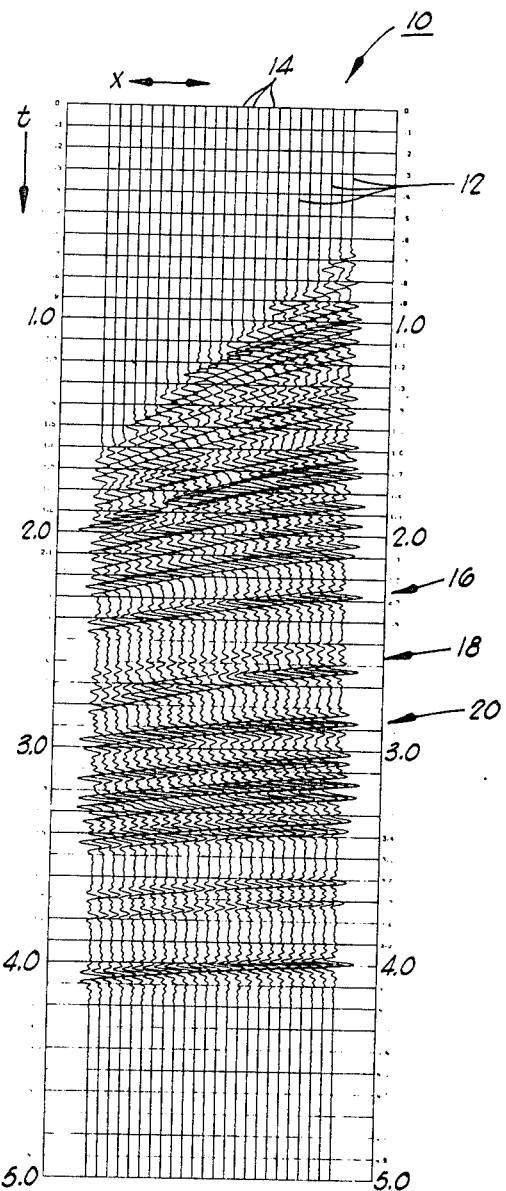
FIG. 1 is an idealized form of plural trace seismic record of a type which may be derived for common basement points within a sector of terrain.

Thus, the seismogram 10 of FIG. 1 illustrates a typical group of seismic traces which may be suitable for use in the present method. The seismogram 10 consists of a set of individual traces 12 which are recorded with different geometries but having the same basement or common depth point. Thus, while distance $x$ along the surface of the earth indicates different placements of seismic source and detector equipment, each seismic energy path may be considered as having traveled from its respective surface source position downward for reflection at a specific subterranean point, thereafter to travel upward for detection at a specifically located seismic detector location. The distance $x$ may be indicative of a selected distance such that the individual spacing increments 14 each denote a uniform offset distance of the respective seismic detector relative to a vertical projection from its common depth point.

The seismogram 10 is an idealized synthetic data representation and it should be understood that normal field-recorded seismic data is masked over to a great degree by extraneous signal return in the form of noise, multiple reflections and various other forms of interference. Further, while seismogram 10 illustrates each event of each trace with uniform amplitude characteristic this will not be the case in field-recorded seismic data, and it is due to this shortcoming that the present method for establishing velocity coherence becomes an invaluable tool in seismic return processing and interpretation.

A well-known equation used for normal move-out correction is $$d_{ij}(t) = \sqrt{\frac{X_i^2}{V_j(t)} + t^2} - t \qquad (1)$$

where $d_{ij}(t)$ is the correction applied to the trace at the $i^{th}$ offset ($x_i$) and $j^{th}$ velocity ($V_j$) at a time $t$.

A group of common depth point traces, such as seismogram 10 of FIG. 1, may be illustrated as follows:

$$a_{11}, a_{21}, a_{31}, \ldots, a_{m1}$$
$$a_{12}, a_{22}, a_{32}, \ldots, a_{m2}$$
$$a_{13}, a_{23}, a_{33}, \ldots, a_{m3}$$
$$\cdot \quad \cdot \quad \cdot \quad \cdot \quad \cdot$$
$$\cdot \quad \cdot \quad \cdot \quad \cdot \quad \cdot$$

$$a_{1n}, a_{2n}, a_{3n}, \ldots, a_{mn}$$

The above matrix representation identifies the family of traces in terms of individual, successive sample points $j$ as disposed along respective seismic signal traces $i$. Thus, $n$ is the number of traces or CDP parts while $m$ is equal to the number of samples and, at every sample point, the sum of the parts can be computed in the same manner as when effecting a straight composite of multitrace values. Such a straight composite function or summation may be represented by $$S_j = \sum_{i=1}^{n} a_{ji} \text{ where } j=1, 2, 3, \ldots, m \quad (2)$$

It is then possible to compute the mean value at every sample point:

$$\bar{a}_j = S_j/n \text{ where } j=1, 2, 3, \ldots, m \quad (3)$$

and given this value, we can then compute the difference between each common depth point trace and the applicable common depth point mean with subsequent summation to generate absolute values of these differences. This may be done for each sample point by determining this difference as $$d_j = |\bar{a}_j - a_{j1}| + |\bar{a}_j - a_{j2}| + |\bar{a}_j - a_{j3}| + \ldots, |\bar{a}_j - a_{jn}| \quad (4)$$

where $j=1, 2, 3, \ldots, m$.
With the final result that $$d_j = \sum_{i=1}^{n} |\bar{a}j - aji| \quad (5)$$

as $j=1, 2, 3, \ldots, m$

The reciprocal of the summed difference or $(d_j)^{-1}$ may then be derived for application as a weighing coefficient to the summation of absolute trace value so that a final output or mean-difference-sum value may be represented as:

$$O_j = (f_j)(d_j)^{-1} \text{ as } j=1, 2, 3, \ldots, m \quad (6)$$

This treatment then has the effect of attenuating strongly those seismic events which have large differences between their parts and their mean, i.e., the incoherent events or the misaligned coherent events, while it has the converse effect of providing much less attenuation for those events which are lined up in coherent relationship.

After processing to perform the composite in terms of mean-difference-sum of the trace values, such processing being carried out relative to a plurality of selected constant velocities, there will be derived as many mean-difference-sum composite traces as there are selected velocities. Thus, for a particular event, the mean-difference-sum output trace with the highest amplitude will indicate that velocity which has the best time lineup for the event, i.e., the velocity which provides the highest coherence for that event as between the plural input traces. The process is capable of providing sharp discrimination between the best velocity and all other velocities as regards a particular plurality of related event indications across plural seismic traces.

In order to obtain a degree of time averaging and, also, in order to use power within a trace segment as a measure of trace verification, absolute amplitudes of the traces may be summed over selected lengths as discrete times for the entire length of the respective traces. Such summation of absolute amplitude would adhere to $$O_j = \sum_{i=1}^{m} |t_{ij}| \quad (7)$$

where $j=k, 2k, 3k, \ldots, nk$ and where $O_j$ is the output at time sample $j$, and $t$ is the input trace as sampled at $i$ intervals with $m$ samples per $k$ time sample. This further requiring that $k$ is greater than or equal to $i$.

Having derived amplitude values for each of a plurality of time samples $j$, such values can then be plotted as a function of velocity. Such a plot is carried out to construct a velocity spectrum plot 22 as shown in FIG. 2. Thus, amplitude values for each incremental time sample are plotted in successive order and, in accordance with the velocities where such amplitude values occur, the velocity spectrum plot 22 is constructed. Such a velocity spectrum plot 22 in terms of velocity (horizontal) per vertical travel time (vertical) may be carried out for one or any number of related seismic traces referenced to a common depth or basement point.

Inspection of the velocity spectrum plot 22 indicates a trend of increasing velocity of the successive seismic event energies as the seismic signals penetrate deeper in the earth's surface. Sample points of the area 24 indicate a spread of different velocities in the area of 5,600 feet per second and this is characteristic of upper strata noise and multiples generation. Valid velocity coherence is first discernible at about 1 second travel time and velocity of approximately 6,400 feet per second. And, as travel time increases downward, towards 4-second vertical travel time, velocity coherence at increasing velocity value is apparent with final velocities at around 8,200 feet per second for the deepest returns, i.e., the area 28 of the velocity spectrum plot 22.

Utilizing the same information, it is then possible to compile a power trace 30 which may be displayed in related manner to the velocity spectrum plot 22. The power trace 30 consists of the peak velocity amplitude for each time sample $j$ along a continuous time trace. Thus, every peak value on the power trace 30 may be interpreted as representing the occurrence of an independent seismic event along the vertical travel path of the signal energy.

The method of the invention can be performed to provide even sharper contrast or indication of velocity coherence by exponential weighting of selected coefficients in the coherence determination circuitry, as will be further described below. This portion of the processing entails exponential weighting of the reciprocals of the difference trace values to a power $p$ in such a manner that $$O_j = (S_j)(d_j)^{-p} \quad (8)$$

where $O_j$ equals output of time sample $j$, $S_j$ equals the sum of trace values at time sample $j$, and $d_j$ is equal to the related difference values. If sharper contrast is desired, $p$ can be made greater than 1 or, if less contrast is desired, $p$ should be made smaller than 1.

It should be kept in mind too that increasing of the mean-differential-sum power coefficient $p$ also increases the contrast or amplitude difference as a function of time, this may not be desirable in all cases. What is most desirable is an increase of contrast as a function of velocity, and this may be obtained for each time sample by ascertaining peak velocity for a selected maximum velocity or $V_{max}$ such that, thereafter, all velocities relating to that particular time sample will be raised to a power $q$ and multiplied by a constant such that the amplitude of $V_{max}$ is retained unchanged. This may be done in accordance with $$V_{IJ} = (V_{IJ})^q \left[ \frac{V_{Jmax}}{(V_J)_{max}^q} \right] \quad (9)$$

where $I$ is the velocity index and $J$ is equal to time.

Figure 3:
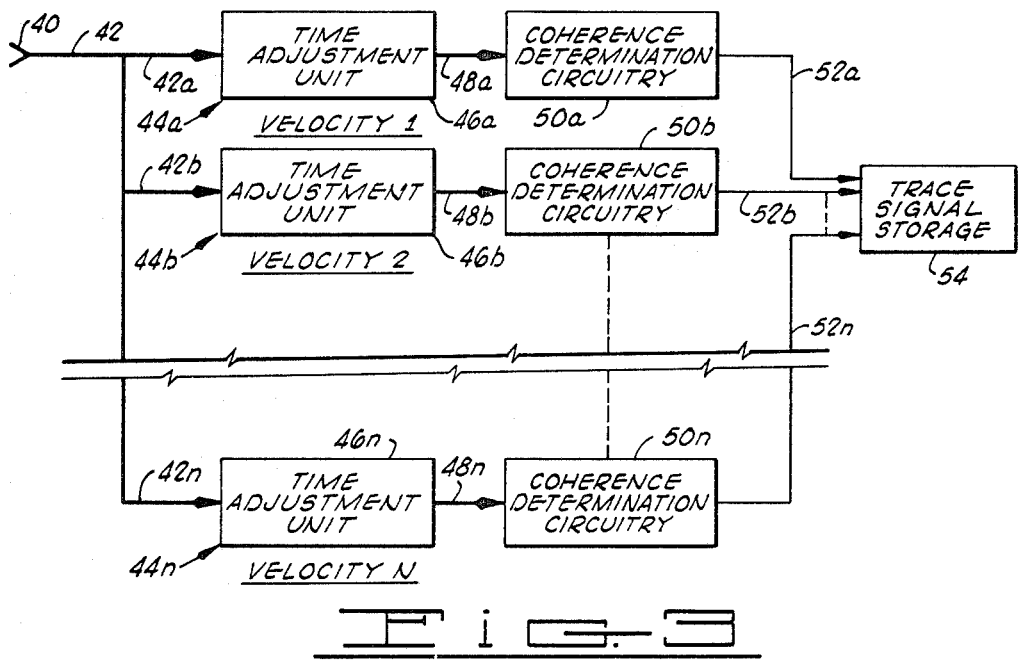
FIG. 3 is a block diagram illustrating the general method of the invention.

Any of the various forms of apparatus, either digital or analog, may be employed in carrying out the method of the invention. The functional block diagram of FIG. 3 illustrates such performance in its essential steps. That is, a plurality of related seismic trace inputs may be applied at an input 40 for application via plural-lead cable 42 and its parallel branches 42a, 42b through 42n to respective processing channels 44a, 44b through 44n. Each of the parallel processing channels 44a, b-n effects a particular time adjustment or delay per trace of the individual multitrace inputs for subsequent determination of velocity coherence. Thus, each of time adjustment units 46a, 46b through 46n provides time adjusted scanning of plural traces at selected different delays per trace, the delays being equatable to respective velocity 1, velocity 2, through velocity $n$ as chosen for the particular velocity structure.

The plural, velocity-adjusted outputs are present in lead groups 48a, 48b through 48n for input to respective coherence determination circuitry 50a, 50b through 50n. Each unit of coherence determination circuitry 50a, b–n then examines the plural trace seismic information for coherence of energy occurring at its particular velocity 1, 2 through n, to produce a coherence factor output on respective leads 52a, 52b through 52n to a suitable form of trace signal storage 54. The trace signal storage 54 may be any of various forms of well-known analog or digital recording equipments as are generally employed in the geophysical prospecting art.

More particularly, and referring now to FIG. 4, each processing channel 44a, b–n may be constructed similar to the single velocity processing apparatus 56. The processing apparatus 56 consists of plural inputs 58a, 58b through 58n which receive plural trace seismic information for input to a time delay unit 60. The time delay unit 60 may be a well-known type of plural channel recorder drum having respective plural, time-adjustable pickup heads associated therewith. Such a suitable type of time delay unit is more particularly described for similar usage in U.S. patent application, Ser. No, 749,723, now U.S. Pat. No. 3,496,531, entitled "Method and Apparatus for Determining and Applying a Gain Function," filed in the name of Sullivan et al. and assigned to the present assignee.

Suitably delayed trace outputs from time delay unit 60 are applied via leads 62a, 62b through 62n to a summing circuit 64. The summing circuit 64 is a type that averages each of the input trace signals present on leads 62a, b–n to provide an output on lead 66 which is a voltage equal to the average of all of the input trace signals. Such a summing circuit 64 is fully disclosed at page 458 in a book entitled "Reference Data for Electrical Engineers," 4th Edition, published by International Telephone and Telegraph.

The trace average output on leads 66 is applied in parallel to each of the plurality of difference networks 68a, 68b through 68n. Each of the time-delayed trace signals on leads 62a, b–n are applied to the respective difference networks 68a, b–n for comparison with the trace average signal applied on lead 66. Thus, each of difference networks 68a, b–n provides a trace difference output on leads 70a, 70b through 70n which is, respectively, equal to the average trace value less the respective time delay input trace values at the particular selected velocities. A suitable form of circuitry for employ as difference networks 68a, 68b–68n may be selected from any of various well-known types which are widely employed in the related art.

Each of the difference trace outputs on leads 70a, b–n are applied to a reciprocal network 72 which derives a reciprocal of the sum of all difference trace outputs for application via lead 74 to an adjustable exponent circuitry 76. As shown in FIG. 5, the reciprocal network 72 may take the form of a plurality of full wave rectifiers 78a, 78b through 78n which convert the respective trace difference signals from leads 70a, b–n to an absolute value for application via leads 80a, 80b through 80n to a suitable form of summing network 82. Summing network 82, also of well-known type, then provides an output via lead 84 to a selected form of reciprocal circuit 86, and reciprocal circuit 86 then provides an output on lead 74 which is equal to the reciprocal of the sum of the trace difference voltages. The reciprocal circuit 86 may take any of various forms; for example, it may be an analog/digital type of device as is disclosed in the aforementioned U.S. patent application Ser. No. 749,723, now U.S. Pat. No. 3,496,531; or, the reciprocal circuit 86 may take purely analog form, e.g., such as multiplier circuitry operating in conjunction with a function generator, as is disclosed at page 23 of "The Encyclopedia of Electronics," edited by Charles Susskind and published by Reinhold Publishing Corp. Still other forms of analog circuitry for carrying out the reciprocal function are disclosed at pages 468–471 of "Vacuum-Tube and Semiconductor Electronics" by Millman as published by the McGraw-Hill Book Company, Inc.

The reciprocal signal output on lead 74 is then applied to a suitable form of adjustable exponent circuitry 76 which serves to effect nonlinear conduction of the trace reciprocal signal. The adjustable exponent circuitry 76 may take the form of any various well-known nonlinear circuits such as diode network having a selected exponential resistance versus applied voltage characteristic. Thus, when the reciprocal of the sum of the trace difference signals is passed through the adjustable exponent circuitry 76, the output signal value will be raised by a selected exponential operation such as, for example, to the exponent 1.5, 2, etc., thereby to accentuate or emphasize the output signal present on a lead 88 for utilization as a gain control signal.

The trace average signal output on lead 66 from summing circuit 64 is also applied to a full wave rectifier 90 which serves to render the trace average signal as an absolute value, i.e., disregarding sign of polarity to enable treatment as an arithmetic value. The absolute trace average signal output on lead 92 is then applied to a multiplier circuit 94 which is gain-controlled as a function of the accentuated, reciprocal of the summation signal present on lead 88. The multiplier circuit 94 may be a well-known form of analog multiplier receiving input via lead 92 for amplification in accordance with a variable gain factor as controlled by input on lead 88. Such multiplier circuitry is well known and specific reference may be made to any of the aforementioned textual works.

The output from multiplier 94 is then applied via a lead 96 to a full wave rectifier 98 which serves to establish the coherence factor as an absolute value. The absolute value of coherence factor is then available for output to provide selected meaningful indication. Thus, such coherence factor output may be applied to a well-known form of analog trace recorder 100 for storage of the variable trace signal, it being subject to recall as needed for interpretative purposes. Also, the absolute value obtained from full wave rectifier 98 may be applied a suitable form of integrator 102 which serves to sum instantaneous output values over a preselected time interval with subsequent plotting of the trace information through application to an output device 104.

In operation, the apparatus of FIGS. 3, 4 and 5 may be utilized to examine selected groupings of plural-trace seismic information in order to establish certain velocity coherence relationships. While it is preferable that common depth point seismic trace information be applied as input to such a coherence factor processing system, it is not an absolute requirement as still other closely related multitrace seismograms may provide proper subject matter for such velocity coherence plotting.

The processing of plural trace information at each of a plurality of different velocities to establish the particular coherence factor for selected velocities may consist in the utilization of a plurality of processing channels 44a, 44b through 44n, or it may consist in repeatedly applying the plural traces of information through a limited processing apparatus 56 a plurality of times with different velocities set into time delay unit 60 on each successive pass or operation.

In any event, for a first velocity $v1$ set into the trace-to-trace relationship of time delay unit 60, the respective output lead 62a, b–n will provide first trace outputs which may be identified as $t_{1v1}$, $t_{2v1}$ through $t_{nv1}$ and these are applied for summation in summing circuit 64 as well as to the respective difference network 68a, b–n. The summed traces from summing circuits 64 on lead 66 are identified as $t_{sv1}$ and this voltage is also applied to the respective difference networks 68a, b–n to derive at respective leads 70a, b–n the difference signal voltages $(t_{sv1}-t_{1v1})$, $(t_{sv1}-t_{2v1})$ and $(t_{sv1}-t_{nv1})$, respectively. These difference voltages are further applied into full wave rectifiers 78a, b–n (FIG. 5) for further summation as absolute values which sum is applied through a reciprocal circuit 86 to derive a trace $t_{dv1}$ as present on lead 74 to adjustable exponent circuitry 76.

The output from adjustable exponent circuitry 76 forms a trace $t_{xv1}$ which may then be multiplied in multiplier 94 with the absolute value of $t_{sv1}$ present on lead 92 to generate an output trace $t_{ov1}$ on lead 96 to full wave rectifier 98. The trace $t_{ov1}$ is again converted to an absolute value in full wave rectifier 98 whereupon it may be summed over discrete time intervals in such as an integrator 102 to generate a trace output for plotting purposes. Such trace output form integrator 102 may then be applied to a suitable output device 104.

Figure 6:
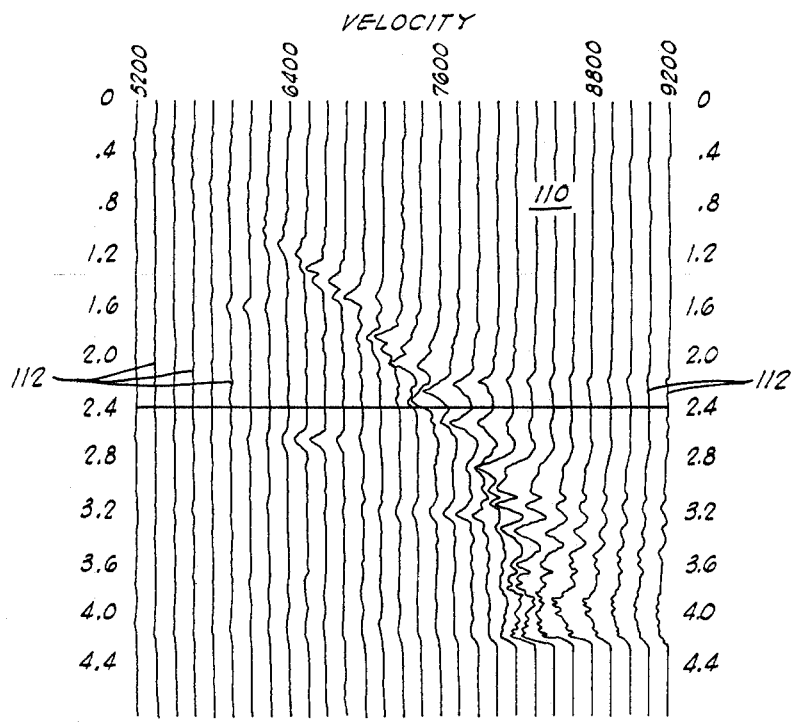
FIG. 6 is one form of output representation, velocity versus vertical travel time, which may be provided through utilization of the present method.

The output device 104 may be a recording device for recording output trace results in terms of velocity and signal travel time as is shown in FIG. 6. Thus, a record 110 may consist of a plurality of traces 112 laid out in consecutively adjusted position along a time scale which is equated to seismic signal travel time, i.e., from time 0 through 4.4 seconds as shown. Each of the individual traces 112 represents the amount of coherence between respective events of the related plural input traces over a range of velocities. Thus, each of the consecutive traces 112 will relate to an incrementally varied velocity from 5,200 feet per second through 9,400 feet per second.

The above procedure relative to derivation of a coherence factor trace $t_{ov1}$ would relate to the trace as derived for a single selected velocity $v_1$. Additionally, successive trace lines of FIG. 6, or coherence factor traces, would be derived by adjusting one or more time delay units 60 at selected different velocities in keeping with some established coherence examination pattern. Such coherence examination pattern may be founded within general application standards or it may be established from prior knowledge of the terrain. Thus, successive additional traces 112 of coherence trace record 110 would consist of $t_{ov2}$ through $t_{ovn}$, the number of trace signals depending upon the selected number of examination velocities.

As shown in FIG. 6, 29 different velocity coherence samples were derived at velocities ranging from 5,200 feet per second to 9,400 feet per second, the test velocities being spaced in 300 feet per second increments. An examination of the trace record 110 is an indication of the presence of the related signal velocities relative to the vertical travel time of the seismic signals, i.e., the depth of the particular events within the earth. In addition, the relative amplitudes indicated by the coherence factor traces gives a comparison indication of the actual energy detected at the various points of indication.

It should be understood that there are various forms of equipment, both digital and analog, which may be employed in deriving such a velocity coherence factor relative to seismic signal travel time for the purposes of establishing a signal power spectrum of a given earth terrain sector. Also, there are various alternatives existent within the coherence processing apparatus 56 (see FIG. 4) which may vary the type and degree of signal or trace accentuation while still contributing to the overall end result of establishing a coherence factor between each one of a plurality of selected signal velocities and the particular terrain. It should also be obvious that digital processing systems may be extremely well adapted for the processing of data in the manner as prescribed above.

The foregoing discloses novel method and apparatus for determining a coherence factor relative to selected velocities of seismic signal within a predetermined seismic section. The invention enables a precise showing of velocity and power content with complete exclusion of extraneous factors which might normally tend to mask the signal returns to such an extent that derivation of similar information would be difficult and even unreliable. Further, utilization of the present method enables the evaluation of correct, interval velocities for a given seismic event at a selected depth or travel time, and such a machine-dependent compilation for a series of common depth point trace groups, and for all events therein, is capable of producing a highly accurate profile representation of an earth section.

Changes may be made in the combination and arrangement of steps as heretofore set forth in the specification and shown in the drawings, it being understood that changes may be made in the embodiments disclosed without departing from the spirit and scope of the invention.

What is claimed is:

1. A method for determining seismic event velocities for plural, related seismic signal trace information which is corrected for time variations due to physical placement of the seismic energy source and reception points, comprising the steps of:

dividing the plural traces in the plural trace groups of time-delayed output traces, each trace group having a predetermined different time delay per trace which is characteristic of a known seismic energy velocity;

combining time-delayed output traces from each trace group into a trace group summation signal;

deriving a plurality of difference signals by taking the difference between each time-delayed delayed trace group output trace and its respective trace group summation signal;

combining the difference signals for each trace group into respective trace group gain control signals; and employing each trace group gain control signal for continuous proportional adjustment of the respective trace group summation signal outputs which are then compiled as an indication of event velocities equatable to said predetermined different time delays per trace of the respective trace groups to form a time versus velocity plot.

2. A method as set forth in claim 1 wherein each step of combining traces from each group comprises:

deriving an algebraic summation of all time-delayed output traces continuous with time.

3. A method as set forth in claim 1 wherein each step for combining the difference signals comprises:

algebraically summing the difference signals for each trace group to produce a respective group gain control signal.

4. A method as set forth in claim 3 which is further characterized in that:

each of said plurality of difference signals is made absolute prior to summation to produce said group gain control signal.

5. A method as set forth in claim 3 wherein said step of combining time-delayed output traces comprises:

deriving an algebraic summation of all time-delayed output traces continuous with time.

6. A method as set forth in claim 1 wherein said step of combining the difference signals comprises:

summing the difference signals for each trace group to produce respective difference sum signals;

deriving a reciprocal value for the respective difference sum signals; and controlling the instantaneous amplitude of the respective group summation signal output in accordance with the respective derived reciprocal signal to accentuate those events having an average velocity which is equatable to the time delay per trace of the respective trace group.

7. Method for determining seismic event velocities of plural, related seismic signal trace information which is corrected for time variations due to physical placement of the seismic energy source and reception points, comprising the steps of:

adjusting the plural traces for a selected time difference per trace which is equal to a predetermined velocity;

summing the adjusted traces to derive a summed trace signal;

deriving plural difference traces each equal to the difference between a respective one of the adjusted traces and the summed trace signal;

adding each of the plural difference traces for subsequent derivation of a reciprocal trace representative of the reciprocal of the added difference traces;

controlling the amplitude of the summed trace signal as a function of said reciprocal trace to provide an output time analog trace having amplitude values indicative of the degree of coherence of seismic events at said predetermined velocity;

readjusting the plural traces a plurality of times for a plurality of selected different timed differences per trace which are equal to a predetermined plurality of velocities; and compiling the resulting plurality of output time analog traces in time-equated comparison such that all energy velocities of interest may be represented for a given group of seismic signal trace information.

* * * * *

PO-1050
(5/69)

UNITED STATES PATENT OFFICE
CERTIFICATE OF CORRECTION

Patent No. 3,638,177      Dated January 25, 1972

Inventor(s) Paul V. Lindblade et al

It is certified that error appears in the above-identified patent and that said Letters Patent are hereby corrected as shown below:

In the claims, Claim 1, line 14, "delayed", second occurrence, should be deleted.

Signed and sealed this 15th day of August 1972.

(SEAL)
Attest:

EDWARD M. FLETCHER, JR.         ROBERT GOTTSCHALK
Attesting Officer                Commissioner of Patents